US012643460B2

(12) United States Patent
Miller et al.

(10) Patent No.: US 12,643,460 B2
(45) Date of Patent: Jun. 2, 2026

(54) BARRIER TRANSFER MACHINE TELEMATIC DEVICE

(71) Applicant: Lindsay Transportation Solutions, LLC, Omaha, NE (US)

(72) Inventors: Mark William Miller, Omaha, NE (US); David Edward Babbitt, Omaha, NE (US); Wade Avery Sikkink, Omaha, NE (US)

(73) Assignee: Lindsay Transportation Solutions, LLC, Omaha, NE (US)

( * ) Notice: Subject to any disclaimer, the term of this patent is extended or adjusted under 35 U.S.C. 154(b) by 7 days.

(21) Appl. No.: 18/916,294

(22) Filed: Oct. 15, 2024

(65) Prior Publication Data

US 2025/0242743 A1 Jul. 31, 2025

Related U.S. Application Data

(63) Continuation of application No. 18/581,147, filed on Feb. 19, 2024, now Pat. No. 12,227,120, which is a continuation of application No. 18/426,593, filed on Jan. 30, 2024.

(51) Int. Cl.
| | |
|---|---|
| *B60P 3/40* | (2006.01) |
| *B65G 67/02* | (2006.01) |
| *E01F 15/00* | (2006.01) |
| *E01F 15/08* | (2006.01) |
| *G07C 5/00* | (2006.01) |
| *H04L 67/12* | (2022.01) |

(52) U.S. Cl.
CPC ................ *B60P 3/40* (2013.01); *B65G 67/02* (2013.01); *E01F 15/006* (2013.01); *E01F 15/08* (2013.01); *G07C 5/008* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 5,031,752 A | 7/1991 | Rostowski et al. | |
| 2010/0052886 A1* | 3/2010 | Kessler | ............... B60C 23/0457 |
| | | | 340/447 |
| 2014/0255096 A1* | 9/2014 | Schmidt | ................ E01F 15/006 |
| | | | 404/73 |

(Continued)

OTHER PUBLICATIONS

Non-final Office Action mailed Mar. 3, 2026 in related U.S. Appl. No. 18/426,593, 17 pages.

*Primary Examiner* — Hitesh Patel
*Assistant Examiner* — Wenyuan Yang
(74) *Attorney, Agent, or Firm* — HOVEY WILLIAMS LLP

(57) ABSTRACT

A telematics device for a barrier transfer machine with machine sensors that capture operational data of the barrier transfer machine associated with a barrier segment includes a processing element, a communication element, and a memory element. The processing element is configured to receive the captured operational data. The communication element is in communication with the processing element and is configured to wirelessly transmit a signal representative of at least a portion of the captured operational data. The memory element is in communication with the processing element and is configured to store at least a portion of the captured operational data.

20 Claims, 17 Drawing Sheets

(56) References Cited

U.S. PATENT DOCUMENTS

| | | | |
|---|---|---|---|
| 2017/0091634 A1* | 3/2017 | Ritter | G06F 11/00 |
| 2019/0112164 A1 | 4/2019 | Yuan et al. | |
| 2019/0385387 A1 | 12/2019 | Davidson | |
| 2020/0193728 A1* | 6/2020 | Dutta | G06F 30/15 |
| 2020/0219037 A1 | 7/2020 | Pike et al. | |
| 2021/0403245 A1 | 12/2021 | Provaznik et al. | |
| 2021/0404130 A1* | 12/2021 | Provaznik | B60W 40/06 |
| 2022/0027963 A1 | 1/2022 | Isaac | |
| 2022/0207934 A1* | 6/2022 | Tabata | G07C 5/0808 |
| 2023/0012186 A1 | 1/2023 | Siegel et al. | |
| 2023/0041140 A1 | 2/2023 | Adam et al. | |

* cited by examiner

100

CAPTURE OPERATIONAL DATA OF THE BARRIER TRANSFER MACHINE — 101

STORE CAPTURED OPERATIONAL DATA ON A MEMORY ELEMENT OF THE TELEMATICS DEVICE — 102

TRANSMIT CAPTURED OPERATIONAL DATA VIA WIRELESS COMMUNICATION — 103

BARRIER TRANSFER MACHINE TELEMATIC DEVICE

RELATED APPLICATION

The present patent application is a continuation application that claims priority benefit, with regard to all common subject matter, of co-pending earlier filed U.S. Non-Provisional application Ser. No. 18/581,147; titled "BARRIER TRANSFER MACHINE TELEMATIC DEVICE" and filed Feb. 19, 2024, which is a continuation application that claims priority benefit, with regard to all common subject matter, of co-pending earlier filed U.S. Non-Provisional application Ser. No. 18/426,593; titled "BARRIER TRANSFER MACHINE TELEMATIC DEVICE" and filed Jan. 30, 2024. The prior applications are hereby incorporated by reference, in their entireties, into the current patent application.

BACKGROUND

Barrier transfer machines move strings of roadway barrier segments between positions on roadways. Such machines are large and complicated machines and often must operate on busy roadways where reliability and safety are essential. The complexity of barrier transfer machines makes them vulnerable to unexpected failures, which can create hazardous situations on busy roadways.

The background discussion is intended to provide information related to the present invention which is not necessarily prior art.

SUMMARY OF THE INVENTION

The present invention solves the above-described problems and other problems by providing telematics devices, barrier transfer machines, and methods of relaying operational data of a barrier transfer machine that enable problem detection, predictive maintenance, and remote monitoring of barrier transfer machines.

A telematics device constructed according to an embodiment of the present invention is for a barrier transfer machine with machine sensors that capture operational data of the barrier transfer machine associated with a barrier segment. The telematics device includes a processing element, a communication element, and a memory element. The processing element is configured to receive the captured operational data.

The communication element is in communication with the processing element and is configured to wirelessly transmit a signal representative of at least a portion of the captured operational data. The memory element is in communication with the processing element and is configured to store at least a portion of the captured operational data. The abilities to store and transmit operational data enable remote monitoring of the barrier transfer machine. They also enable cloud computing for analyzing the operational data. Further, monitoring and analysis of the operational data enable early detection of potential issues and predictive maintenance prior to a failure.

Another embodiment of the invention is a computer-implemented method of relaying operational data of a barrier transfer machine. The computer-implemented method includes capturing, via a sensor of the barrier transfer machine, the operational data of the barrier transfer machine; storing, via a processing element of a telematics device of the barrier transfer machine, the captured operational data on a memory element of the telematics device; and transmitting, via a communication element of the telematics device, the captured operational data via wireless communication.

Another embodiment of present invention is a barrier transfer machine for moving along a string of roadway barrier segments. The system includes an entry snout, an exit snout, a conveyor sensor, a sensor, a processing element, a memory element, and a communication element. The entry snout is configured to receive the string of roadway barrier segments at a first location. The exit snout allows the string of roadway barrier segments to exit at a second location. The conveyor system is configured to serially shift the string of roadway barrier segments from the first location to the second location as the barrier transfer machine moves along the string. The sensor is configured to capture operational data. The processing element is in communication with the sensor and is configured to receive the captured operational data. The memory element is in communication with the processing element and is configured to store at least a portion of the captured operational data. The communication element is in communication with the processing element and is configured to wirelessly transmit a signal representative of at least a portion of the captured operational data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
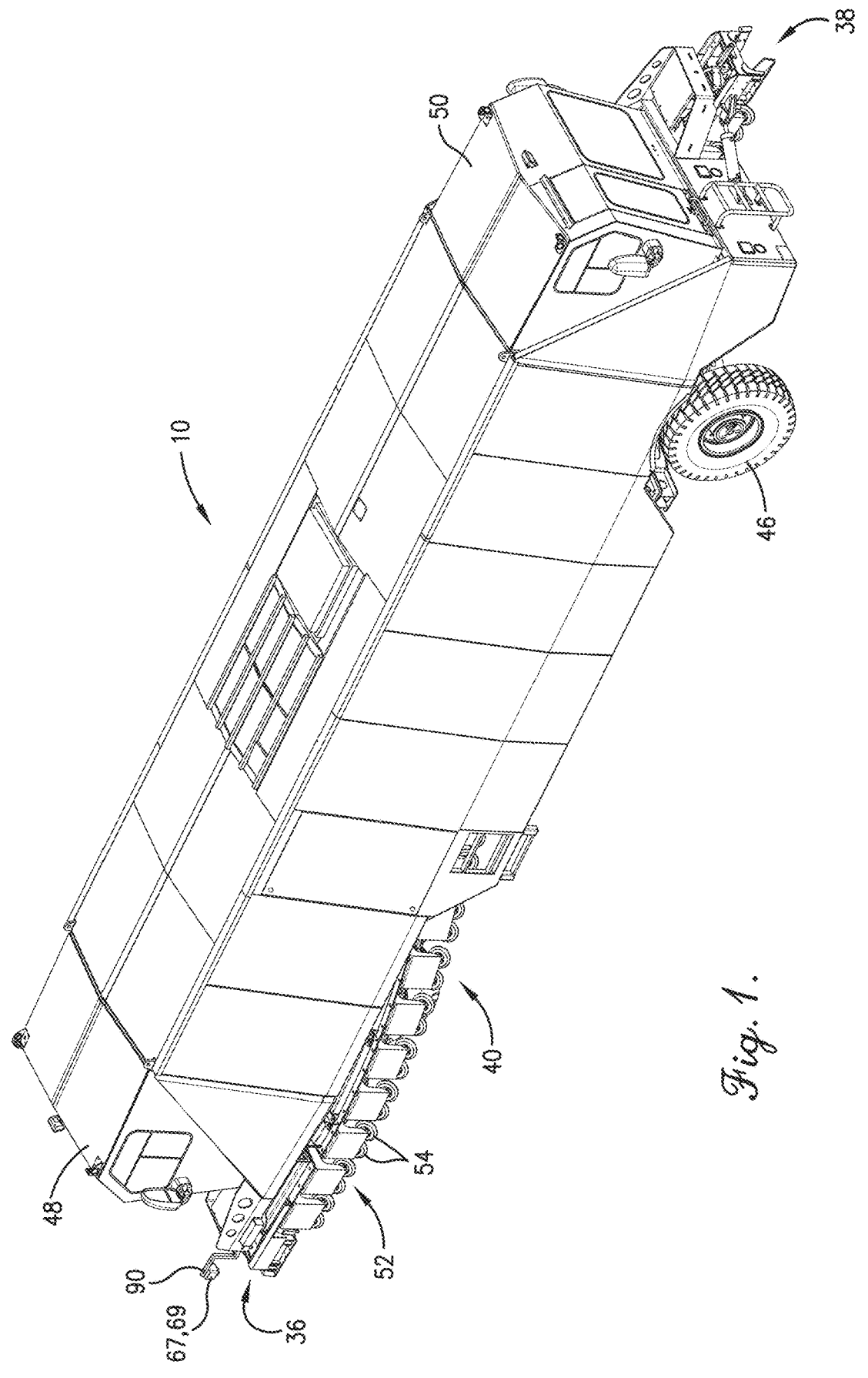
FIG. 1 is a top perspective view of a barrier transfer machine constructed in accordance with embodiments of the present invention.
Figure 2:
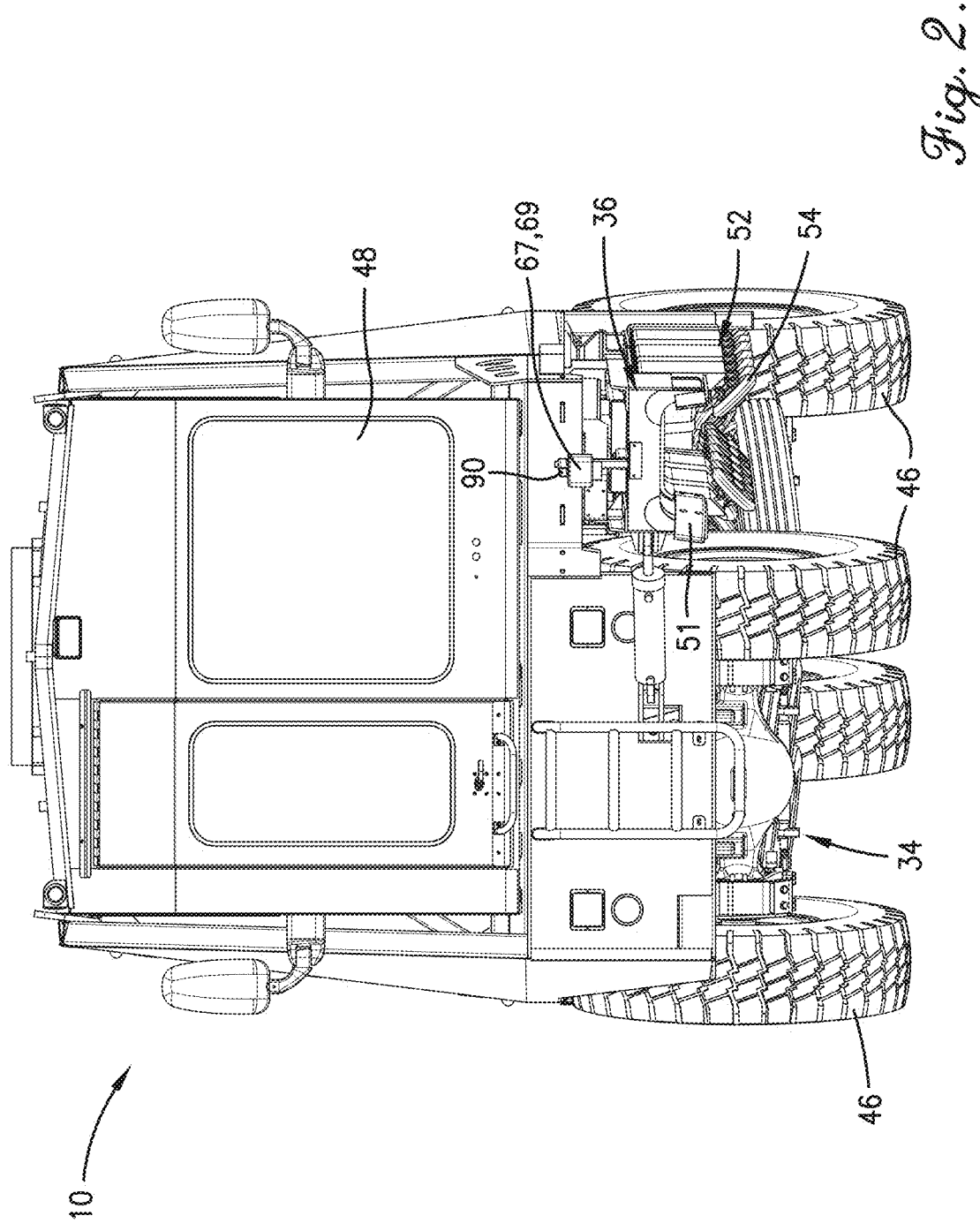
FIG. 2 is a front view of the barrier transfer machine.
Figure 3:
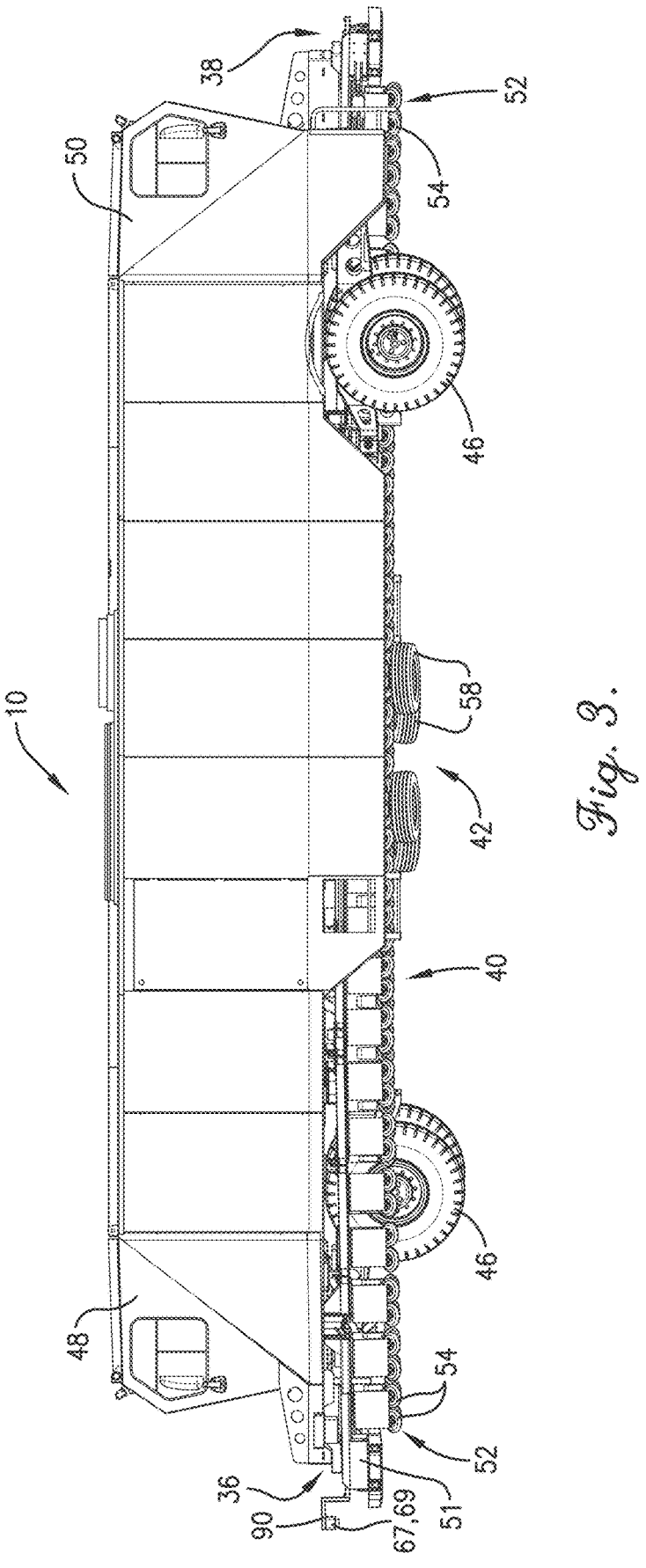
FIG. 3 is a side view of the barrier transfer machine.
Figure 4:
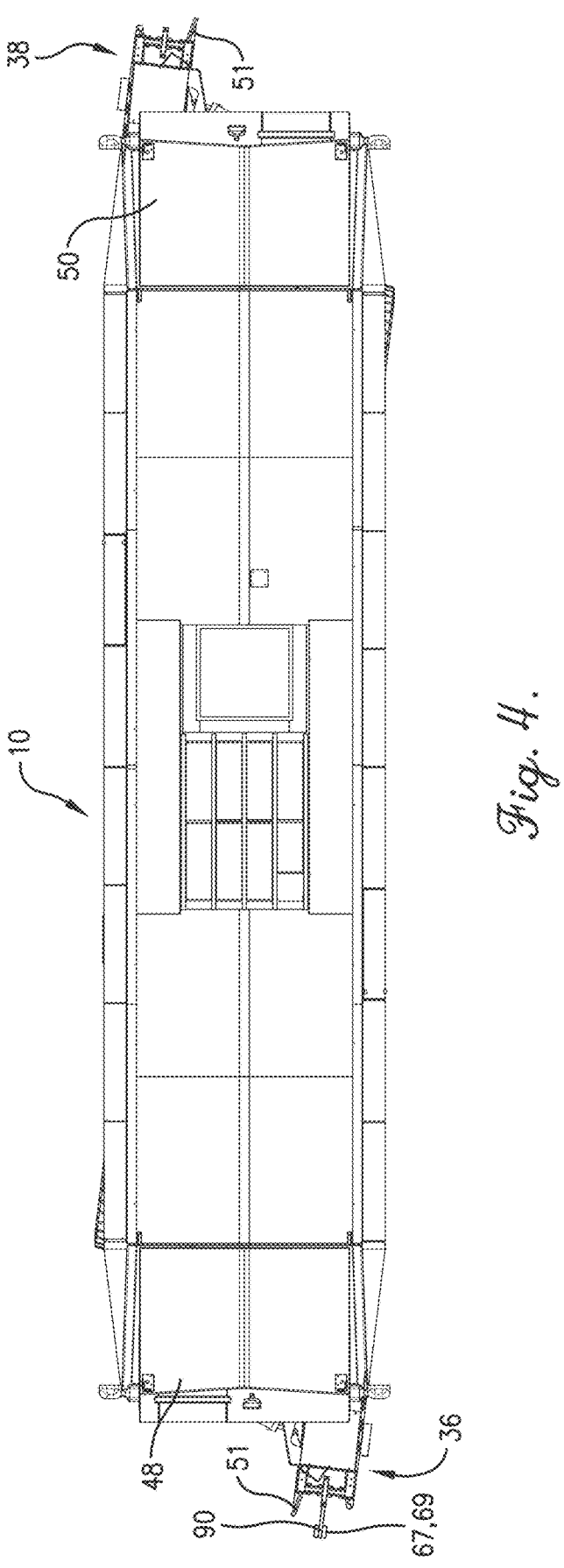
FIG. 4 is a top view of the barrier transfer machine.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 8:
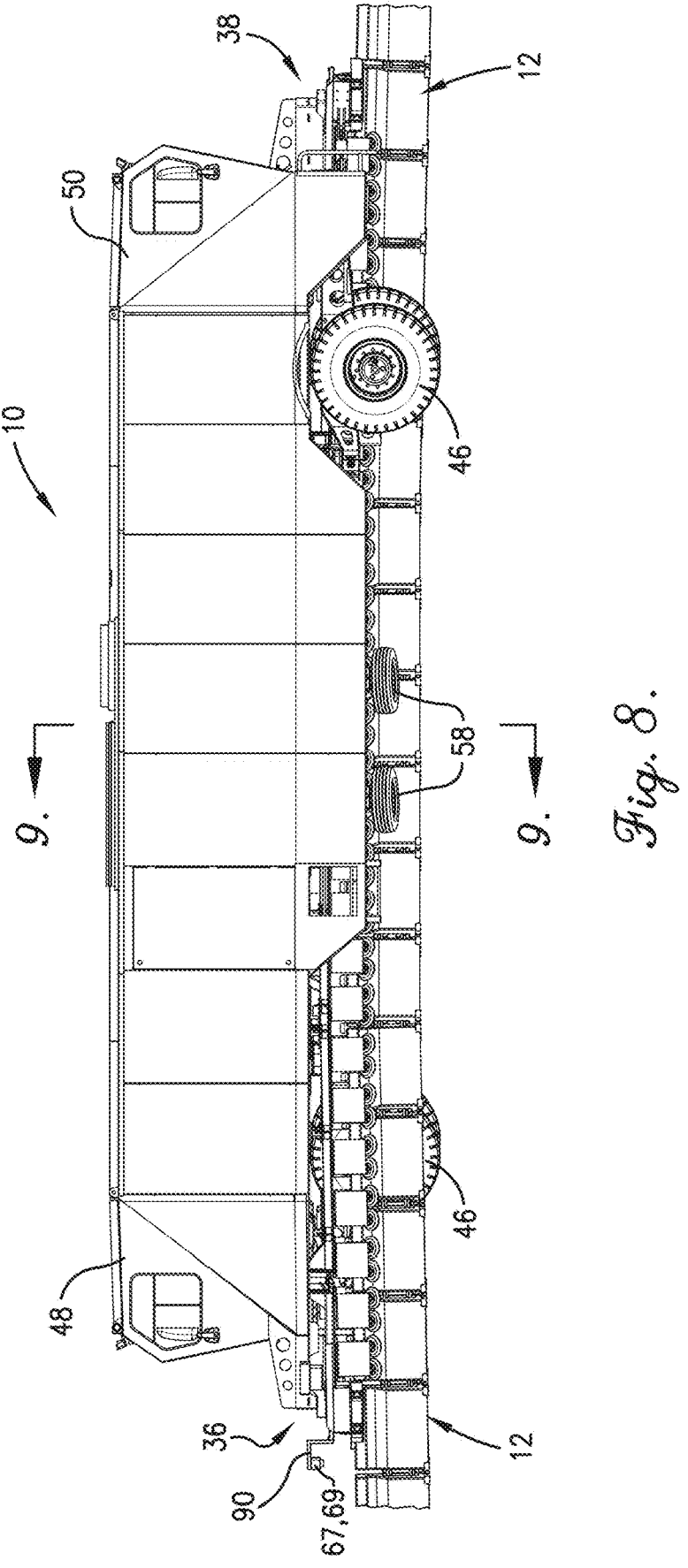
FIG. 8 is a side view of the barrier transfer machine shown picking up and repositioning a span of road barriers.

Turning to FIG. 1, a barrier transfer machine 10 for implementing embodiments of the invention is depicted. As shown in FIG. 8, the barrier transfer machine 10 is configured for picking up and repositioning a span of interconnected road barriers 12 to provide more lanes in directions of peak traffic, to create work zone space for construction crews, or to otherwise make more efficient use of roadway space, increase vehicle capacity, and/or reduce traffic congestion.

Figure 15:
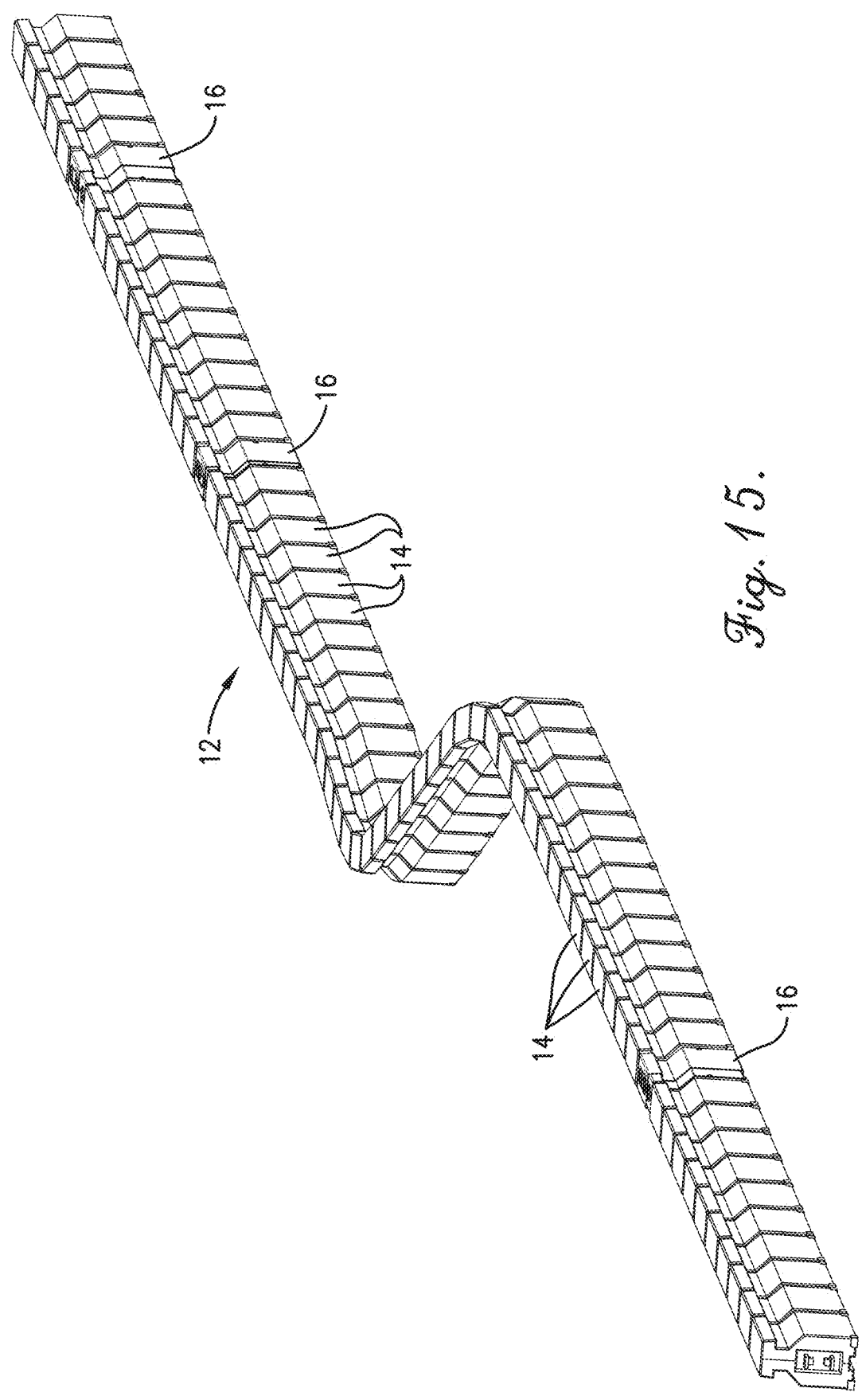
FIG. 15 is a perspective view of an exemplary road barrier span.

An exemplary span of road barriers 12 that may be picked up and repositioned by the barrier transfer machine 10 is depicted in FIG. 15. The span 12 may be any length and may include any number of fixed-length road barriers 14 and variable length barriers 16. In some embodiments, the barriers 14, 16 are connected end-to-end with steel pins and/or tensioning hinge mechanisms described in more detail below.

Figure 9:
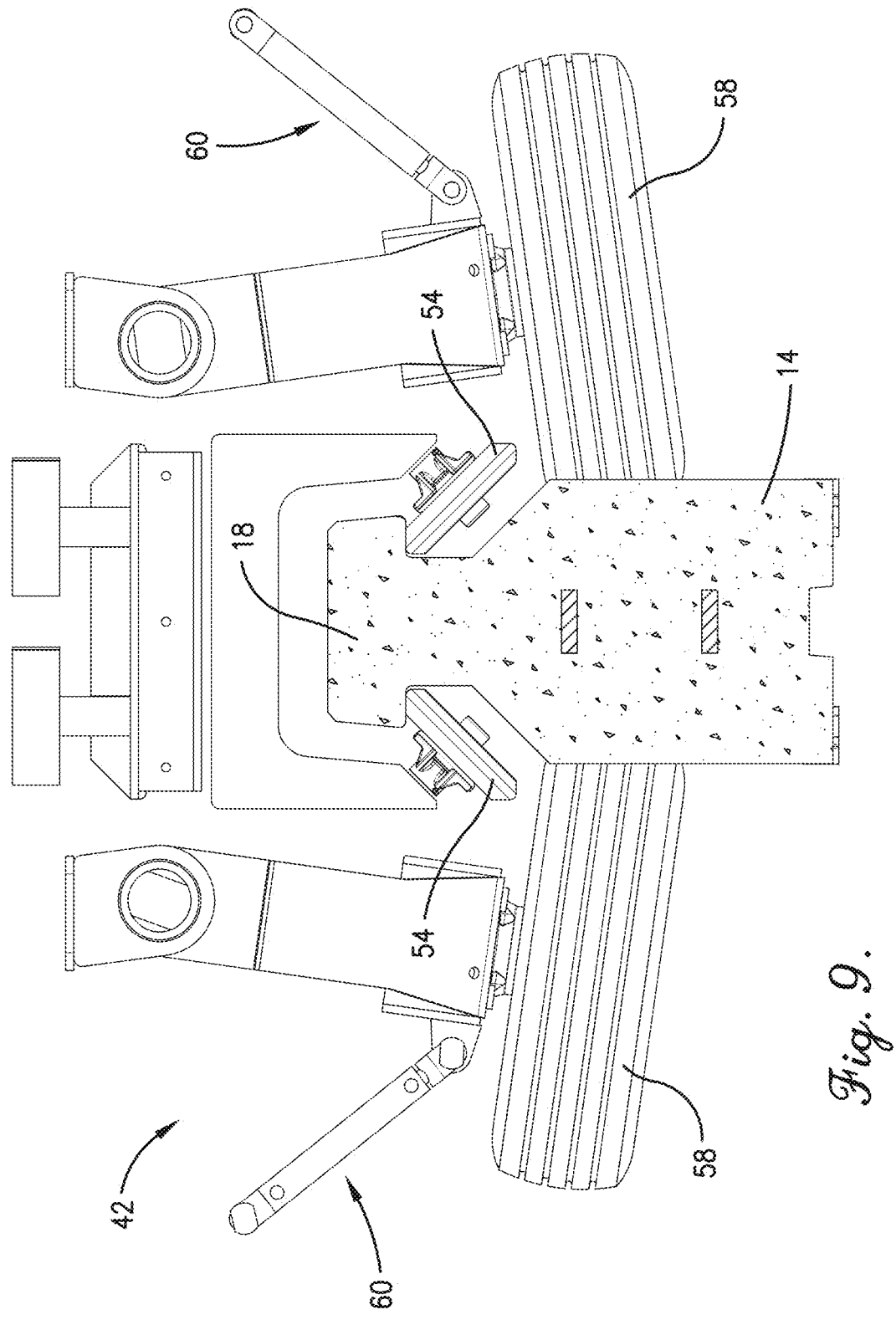
FIG. 9 is a vertical cross-sectional view of the barrier transfer machine taken along line 9/9 of FIG. 8 to better illustrate the capstan system.
Figure 10:
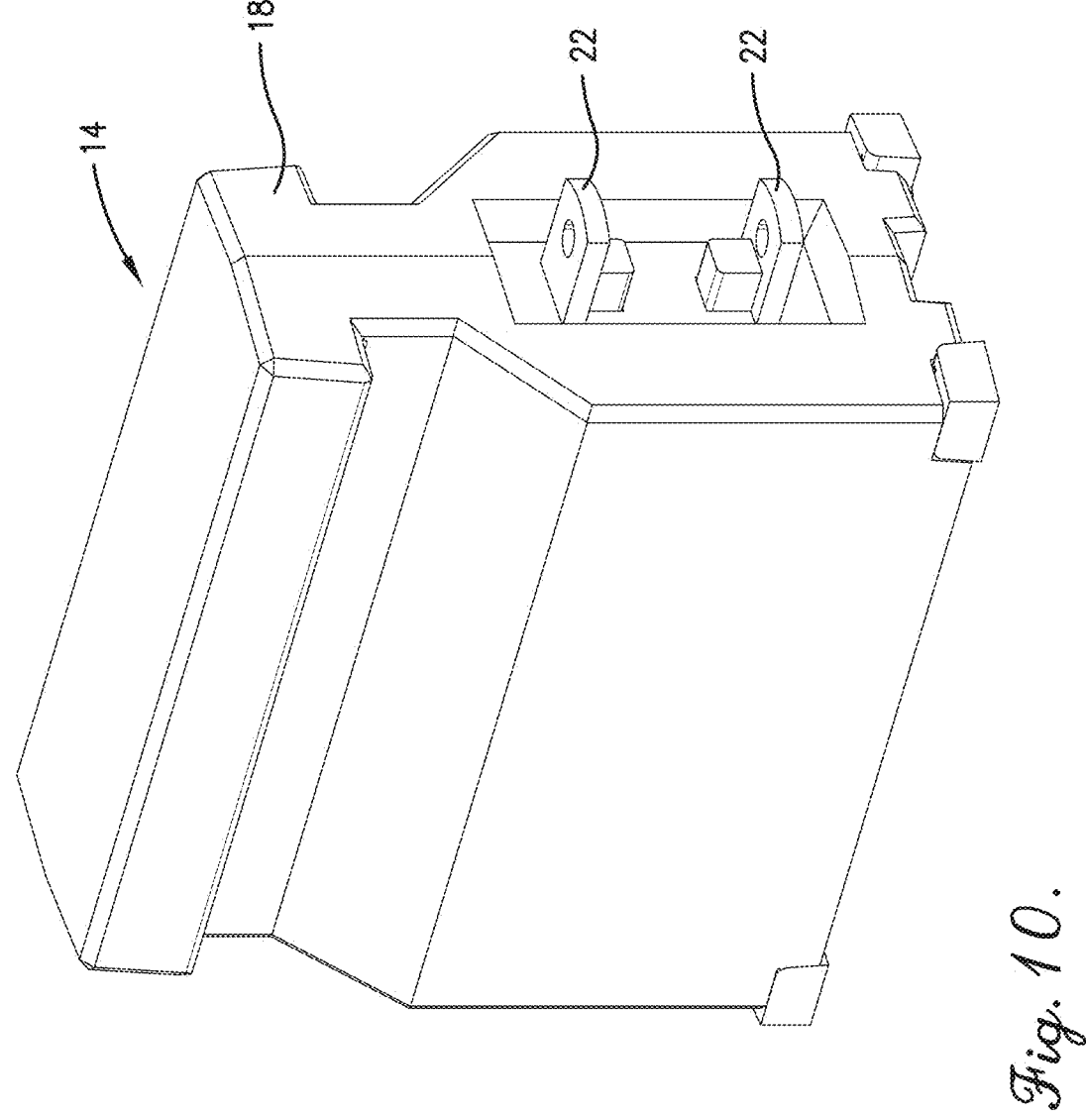
FIG. 10 is a right side perspective view of a fixed road barrier.
Figure 11:
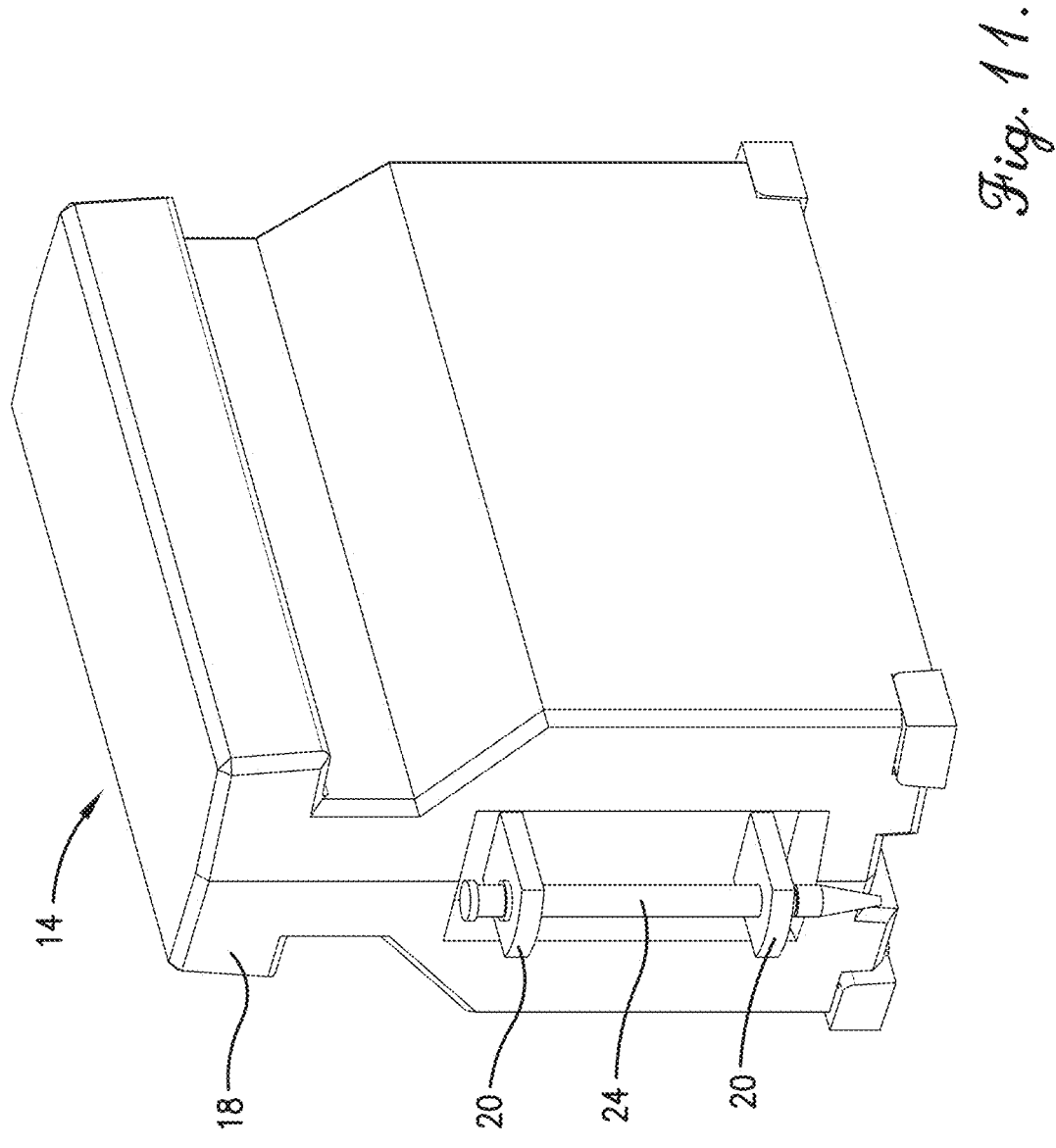
FIG. 11 is a left side perspective view of the fixed road barrier.

Examples of the fixed length barriers 14 are shown in FIGS. 10 and 11. The barriers 14 may be any type, shape, and size and may be formed of any suitable materials such as heavily reinforced concrete or high strength steel frames filled with concrete. In one embodiment, the barriers 14 have T-shaped tops 18 so they can be picked up and repositioned by bogey wheels of the barrier transfer machine as shown in FIG. 9 and described below.

Returning to FIGS. 10 and 11, one side of each barrier 14 includes fixed, spaced apart, connection flanges 20, and the opposite side includes spaced apart, spring biased, reactive tension elements 22. A steel rod 24 may be inserted through holes in the flanges 20 and tension elements 22 of adjacent barriers when they are aligned to interconnect the adjacent barriers. The reactive tension elements 22 allow adjacent barriers to move longitudinally relative to one another when the barriers are under tension or compression. In other embodiments, the fixed length barriers may not have reactive tension elements, but instead may have larger holes in the connection flanges that create "sloppy hinges" to accommodate some longitudinal movement between adjacent barriers.

Figure 12:
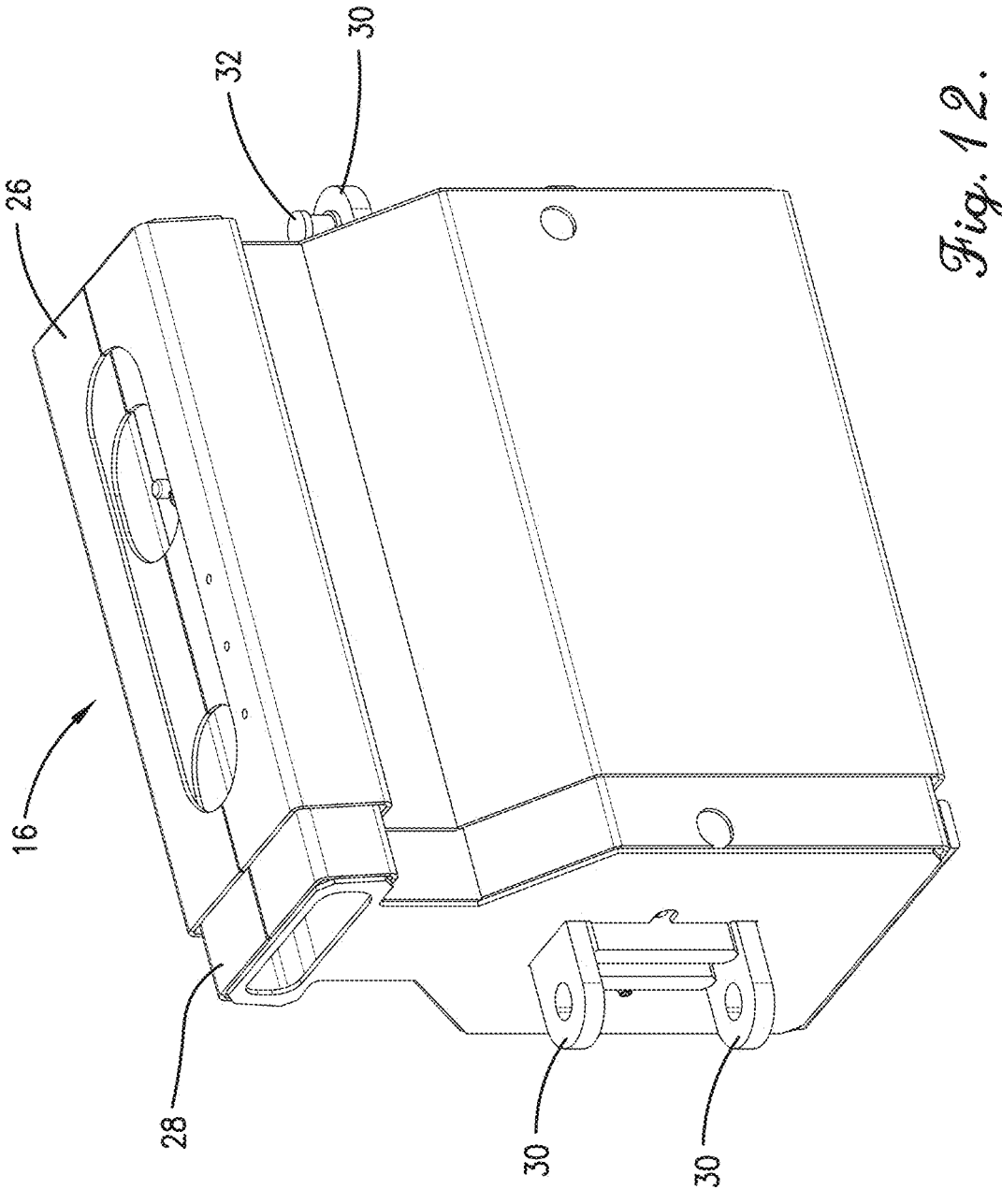
FIG. 12 is a perspective view of a variable length road barrier shown in its retracted position.
Figure 13:
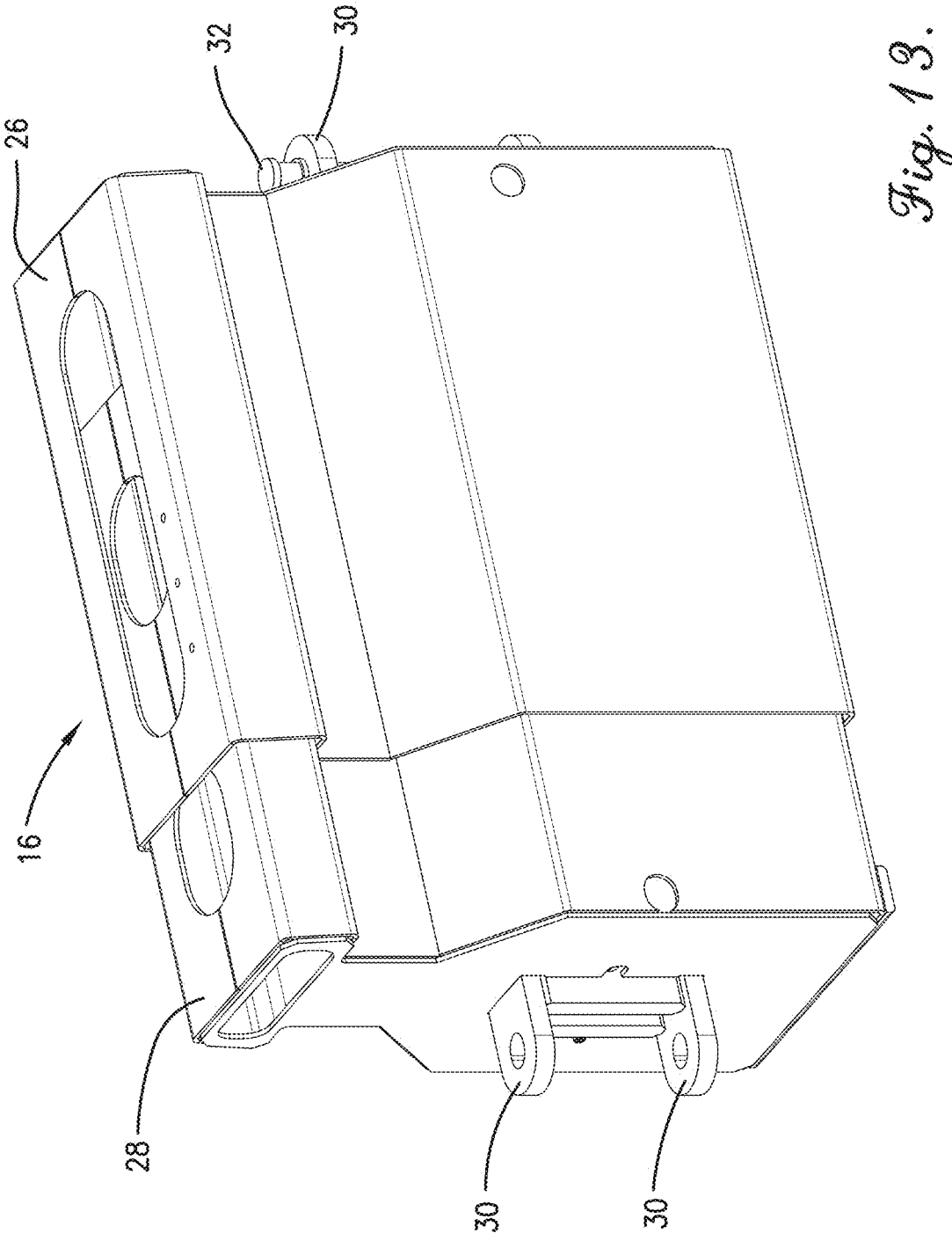
FIG. 13 is a perspective view of the variable length road barrier shown in its mid- stroke or neutral position.
Figure 14:
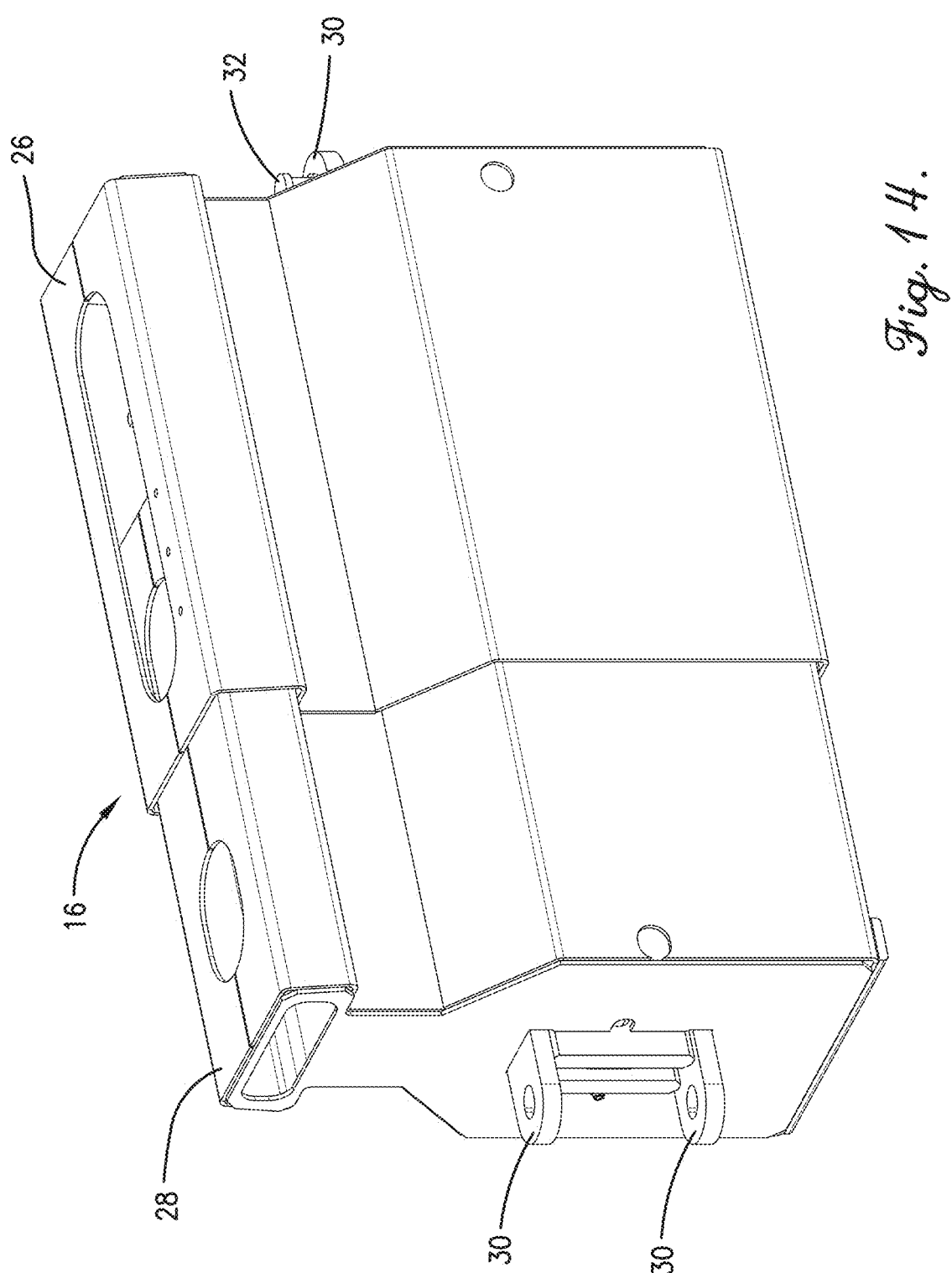
FIG. 14 is a perspective view of the variable length road barrier shown in its fully extended position.

Examples of the variable length barriers 16 are shown in FIGS. 12-14. The barriers may be any shape and size and each has an outer frame 26 and an inner telescoping structure 28 that may move in and out of the outer frame 26 when the barrier is subjected to tension or compression forces. The variable length barriers also include connection flanges 30 that may be aligned with and interconnected to the connection flanges of adjacent barriers with a steel rod 32. Movement of the telescoping inner structure 28 is resisted by internal hydraulic cylinders or other hydraulic or spring mechanisms.

FIG. 12 shows a variable length barrier 16 in its fully retracted or compressed state when subjected to a compressive force of a magnitude sufficient to fully compress the hydraulic cylinders or other biasing mechanisms. FIG. 14 shows the barrier 16 in its fully extended state when subjected to a tension force of a magnitude sufficient to fully extend the hydraulic cylinders or other biasing mechanisms. FIG. 13 shows the barrier in its neutral or steady state when it is not subjected to a compressive or tension force. More details of exemplary embodiments of variable length barriers are disclosed in U.S. Pat. No. 6,439,802, which is incorporated into the present application by reference in its entirety.

Aspects of the barrier transfer machine 10 will now be described in more detail with reference to FIGS. 1-9 and 16. An embodiment of the barrier transfer machine broadly comprises a moveable chassis 34, an entry snout 36, an entry snout positioning mechanism 37, an exit snout 38, a conveyor system 40, a capstan system 42, a control system 44, and a telematics device 76.

The chassis 34 has a forward end and a rearward end disposed along a generally longitudinal axis that is essentially parallel to a roadway over which the machine is driven. The chassis 34 rides on wheels 46, belts, or other ground-engaging traction elements that are driven by conventional engines, transmissions, and associated mechanical and electrical components.

In one embodiment, the barrier transfer machine 10 is equipped with two cabs 48, 50, one at each end of the chassis 34. The machine 10 can be driven in either direction, but typically only one operator in one of the cabs can be in charge of the key controls at any one time. Usually the cab in control is the cab at the end of the machine pointing towards the direction in which the machine is traveling. In some embodiments, the barrier transfer machine 10 may include various sensors and controls that provide autonomous operation without direct operator control or semi-autonomous operation with some operator control.

The entry snout 36 is mounted on a front end of the chassis and is configured for picking up the road barrier span from a first location on a road surface, and the exit snout 38 is mounted on the rear end of the chassis for placing the span back onto the road surface in a second location different from the first location. The snouts act as guides for the road barriers as they are picked up and/or dropped off and can be moved and adjusted by operators of the machine to align the snouts with the incoming road barriers and the desired placement positions. Each snout 36, 38 includes an array of bogey assemblies 52 supported on the conveyor frame described below. Each bogey assembly 52 comprises a number of carrier wheels 54 that pick up, carry, and/or lay down the barriers depending on the direction of travel of the machine.

Figure 5:
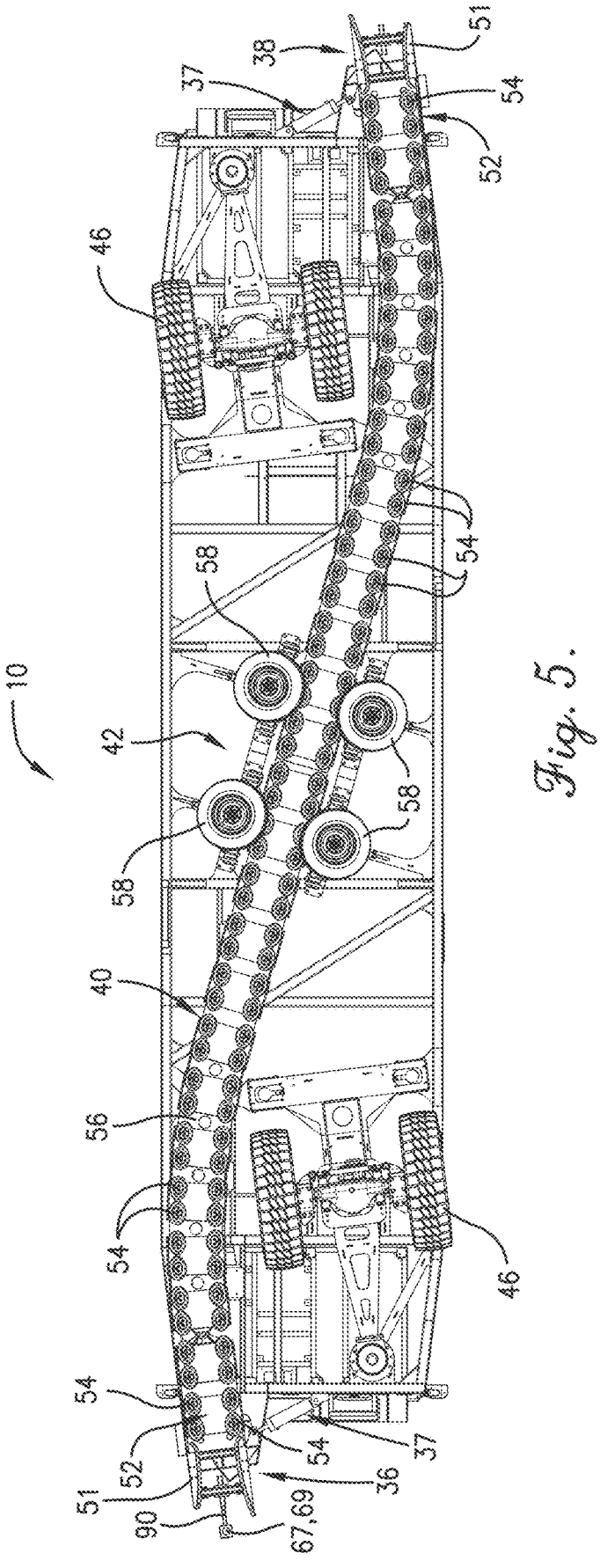
FIG. 5 is a bottom view of the barrier transfer machine.
Figure 6:
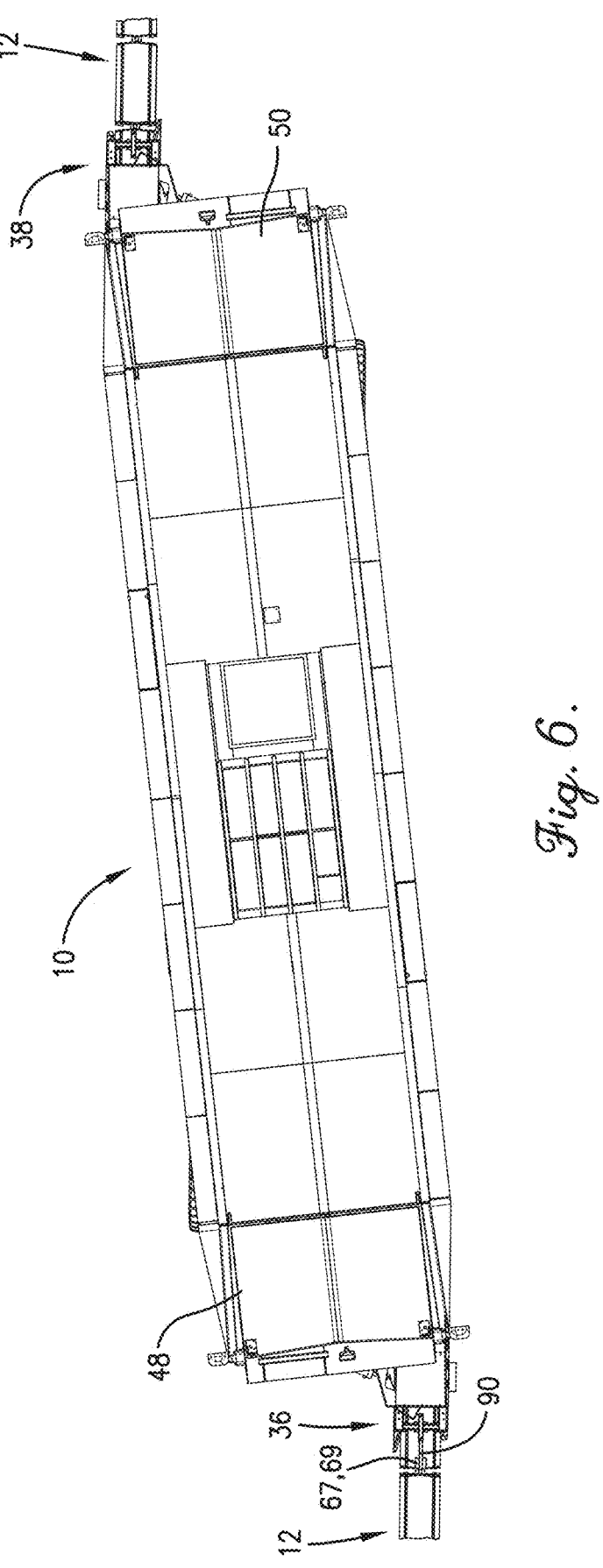
FIG. 6 is a top view of the barrier transfer machine shown moving a road barrier span from one side of a roadway to another side.
Figure 7:
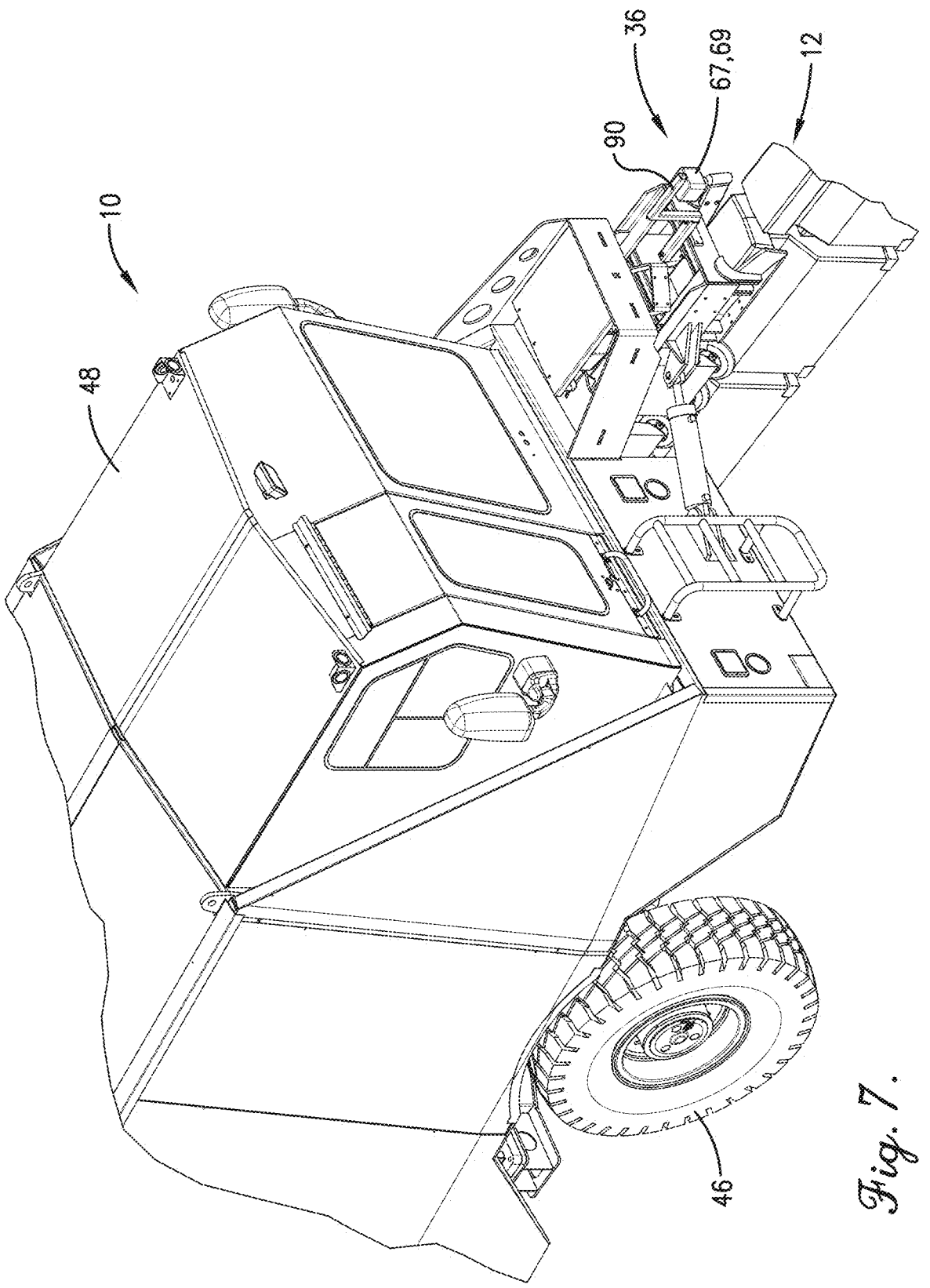
FIG. 7 is a fragmentary front perspective view of the barrier transfer machine shown picking up a span of road barriers.

The entry snout positioning mechanisms 37 are shown in FIG. 5 and are operable to shift the snouts 36, 38 laterally from side-to-side with respect to the longitudinal axis of the machine 10 so as to align the snouts with the barriers before they are picked up. An embodiment of the entry snout positioning mechanisms 37 may include linear actuators, hydraulic cylinders, electric motors, or other mechanisms or combinations of mechanisms for shifting the blunderbuss 51 of the entry snout from side-to-side. In some embodiments, the entry snout positioning mechanisms 37 may be controlled by a joystick or other control system in one or both the cabs of the machine. In other embodiments, the entry snout positioning mechanisms may be controlled automatically by the control system 44 or by a remote operator via the remote computing device described below.

The conveyor system 40 extends beneath the barrier transfer machine and is configured for transporting the span of road barriers from the entry snout 36 to the exit snout 38. The conveyor system 40 may be comprised of multiple assemblies and sections including straight sections, turn sections, and pickup/laydown sections connected to the snouts 36, 38. As best shown in FIG. 5, an embodiment of the conveyor system 40 comprises an S-shaped or otherwise curved structural frame 56 attached to the bottom of the machine and an array of bogey assemblies 52 supported to the frame. Each bogey assembly 52 comprises a number of carrier wheels 54 that pick up and carry the barriers through the machine during a barrier transfer operation.

The capstan system 42 is mounted alongside the conveyor system 40 and adjusts the tension or compression in the road barrier span 12 while it is being transported by the conveyor system in an attempt to keep the barrier span in its original longitudinal location relative to the road. As best shown in FIGS. 5 and 9, an embodiment of the capstan system 42 comprises a pair of large capstan wheels 58 on each side of the conveyor system, hydraulic cylinders, linkages, or other mechanisms 60 for urging the wheels against the road barriers as they pass by, and motors and pumps for driving the wheels so as to apply varying forward and rearward pressures on the road barriers. The capstan system 42 works by clamping the barriers with the capstan wheels 58 as they pass by on the conveyor system 40 and applying either forward or backward rotational pressure on the barriers. This alleviates excessive tension or compression in the span to reduce barrier migration and/or to reposition the barriers relative to one another. The capstan system 42 is especially important in hilly areas, on ramps, and in other situations where a roadway may be inclined. Without the capstan system, the heavy barriers would migrate downhill when picked up and transferred. Migration of the barriers causes excessive tension at the top of an incline and compression towards the bottom making the span difficult and even sometimes impossible to move.

The control system 44 is configured to control the capstan system 42, the entry snout positioning mechanism 37, and the conveyor system 40. The control system 44 may be configured to monitor actual tension and/or compressive forces in the road barrier span 12 and either automatically operate the capstan system 42 or provide instructions to an operator of the machine 10 to alleviate excessive tension or compression to reduce unwanted migration of the span. The control system 44 may also be configured to track and record current locations of the road barriers. The control system 44 may also be configured to align the entry snout 36 with the barriers 12 before the barriers are picked up.

Figure 16:
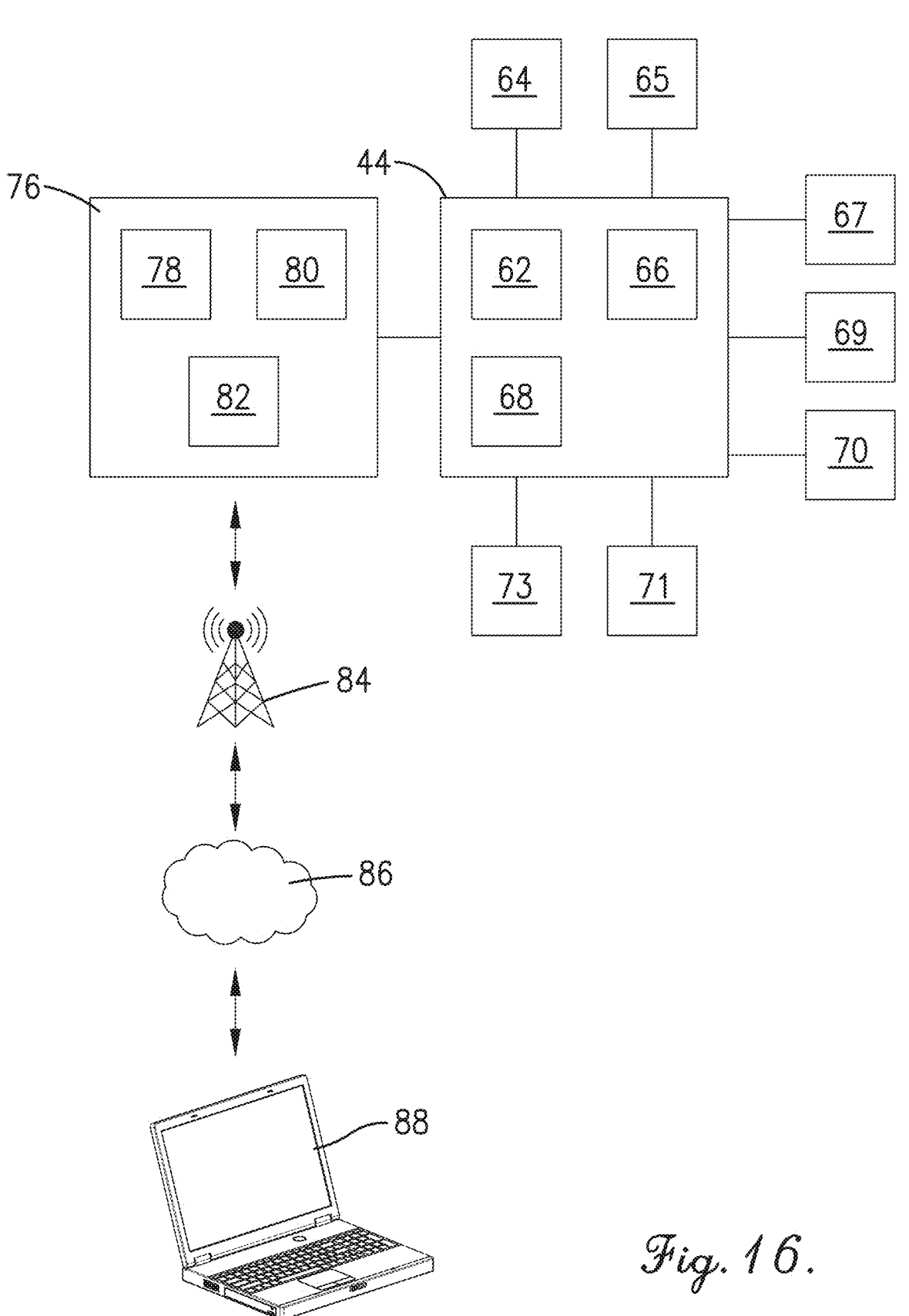
FIG. 16 is a block diagram depicting selected components of an exemplary environment in which embodiments of the present invention may be implemented.

An embodiment of the control system 44 is depicted in FIG. 16 and broadly comprises a communication element 62 for receiving data from at least one of a plurality of sensors 64, 65, 67, 69, 73, a processing system 66 for receiving and analyzing the sensor data and reference data and providing appropriate instructions to other components of the machine 10 or a user interface 70, and a memory element 68 for storing the data. The control system 44 may be a stand-alone control system or may be incorporated in other control systems of the barrier transfer machine 10 including pre-existing control systems.

The communication element 62 may be any device capable of receiving data via wired or wireless connections. The data receiver may be, or include, a wired or wireless network adapter or a wireless data transceiver for use with Bluetooth communication, radio frequency (RF) communication, near field communication (NFC), and/or with a mobile phone network, Global System for Mobile communications (GSM), 3G, or other mobile data network, and/or Worldwide Interoperability for Microwave Access (WiMAX) and the like.

As shown in FIG. 16, the communication element 62 receives data from one or more sensors 64, 65, 67, 69, 73 that are mounted on some of the road barriers and/or on the barrier transfer machine 10 itself.

Some of the sensors 64 may be configured to sense parameters that are representative of tension or compression in the road barrier span and generate corresponding sensor data. In one embodiment, at least one of the sensors 64 is a pressure sensor mounted within or on one of the variable length barriers 16. The pressure sensor 64 senses tension or compression in the barrier span by monitoring pressure within an internal hydraulic cylinder of the variable length barrier 16 and/or a valve connected to the hydraulic cylinder. In some embodiments, a pressure sensor 64 may be mounted in each and every variable length barrier 16 within the span 12. In this embodiment, each sensor 64 includes or is connected to a sensor communication element such as a wireless transmitter for transmitting sensor data to the communication element 62 for analysis by the processing system 66.

In another embodiment, at least one of the sensors 65 may be a linear measurement sensor, optical sensor, or other sensor configured for measuring a length of one of one of the variable length barriers 16. The length of a variable length barrier 16 is associated with tension or compression in the barrier span. For example, a variable length barrier in its fully retracted state (shortest length) as shown in FIG. 12 is under compression and indicates the entire span is under compression, a variable length barrier in its neutral state as shown in FIG. 13 is not subjected to excessive compressive or tension force, and a variable length barrier in its fully extended state (greatest length) as shown in FIG. 12 is under tension and indicates the entire span is under tension. In some embodiments, a linear measurement sensor, optical sensor, or other sensor configured for measuring length may be mounted on or in each and every variable length barricade 16 within the span 12. In these embodiments, each sensor includes or is connected to a communication element such as a wireless transmitter for transmitting sensor data to the communication element 62 for analysis by the processing system 66.

At least one of the barrier position sensors 67 may be a barrier position sensor, such as an optical sensor or camera, light detection and ranging (LIDAR) sensor, or radio detection and ranging (RADAR) sensor, mounted proximate to the entry snout 36 of the barrier transfer machine 10 for sensing positions of at least some of the road barriers before they are picked up and generating related positional data. In embodiments, the barrier position sensors 67 may be mounted on a support arm 90 that extends forward of the entry snout. The positions of the barriers may be associated with tension or compression in the barrier span because barriers that have migrated longitudinally indicate tension or compression in the span. The barrier position sensors 67 may also be mounted on the exit snout, or a rearwardly extending support arm 90, for capturing data, such as images, of the road barriers as they are placed on the road surface and generating associated image data. This image data indicates the relative positions of the road barriers versus lane markers, roadway shoulders, and other markers shown in the images. The barrier position sensors 67 may be any sensing device and/or combinations of devices operable to sense coordinates or relative positions of the road barriers as they are placed on the road surface and generate corresponding location data.

In yet another embodiment, at least one of the sensors 69 may be a GPS unit mounted in at least one of the barriers for determining a position of the barrier before it is picked up and generating related positional data. As mentioned above, the positions of the barriers are associated with tension or compression in the barrier span because barriers that have migrated longitudinally indicate tension or compression in the span. The location sensor 69 may also be a GPS receiver configured to sense the geographic coordinates of each road barrier as it is placed on a roadway. The location sensor 69 may also be mounted on the support arm 90 extending behind the exit snout 38 so it is suspended directly above the location at which each barrier is placed on the ground by the barrier transfer machine. The location sensor 69 and/or the processing system 66 may be triggered by a switch or other mechanism so that the processing system records the coordinates of the center of each road barrier as the road barriers are placed on the ground. In other embodiments, the GPS receiver 69 may be mounted elsewhere on the machine, and the processing system is configured to compensate so the location readings correspond to the coordinates of the centers of the road barriers as they are placed on the ground. In other embodiments, the GPS receiver 69 may acquire multiple coordinates for each road barrier such as the locations of the ends and the center of each barrier. In still other embodiments, the GPS receiver may acquire greater or fewer coordinates for the road barriers. In this embodiment, each sensor includes or is connected to a communication element such as a wireless transmitter for transmitting sensor data to the communication element 62 for analysis by the processing system 66.

One of the sensors may also comprise an entry snout position sensor 73 that senses a position of the entry snout 36 before the road barriers are picked up and generates corresponding entry snout position data. In some embodiments, the entry snout position sensor 73 is a proximity switch, a magnetic position sensor, a potentiometer, a mechanical resolver, or a mechanical encoder operatively coupled with the entry snout positioning mechanism 37, but it may be any sensor or other mechanism capable of sensing the position or relative position of the entry snout before the barriers are picked up by the machine.

The sensors may comprise any number of sensors for capturing operational data about the machine 10. The sensors may include speed sensors configured to detect a speed of the machine 10, accelerometers for detecting vibration signatures of the machine capstan and conveyor rollers 54, 58, force sensors configured to detect a push/pull direction of the machine capstan 42, hydraulic pressures configured to detect machine capstan hydraulic pressure, accelerometers for detecting acceleration of the conveyor system 40, inertial measurement units or the like configured to detect attitudes of the machine 10 and/or the conveyor system 40, tire pressure sensors, etc.

The control system 44 may also receive reference data and other data from the memory element 68 and/or external memory elements 71 in another control system in the barrier transfer machine, external computers, and/or computers, smart phones, and other electronic devices used by operators of the machine. Such data may include expected or reference positions of the road barriers, expected or reference lengths of the variable length road barriers, expected or reference pressure readings of hydraulic components in the variable length road barriers, and/or other data that is analyzed by the processing system 66 and compared to the sensor data to determine if the road barrier span is experiencing excessive compressive or tension forces.

The telematics device 76 is configured to store and/or transmit operational data of the machine 10. The telematics device 76 may comprise a communication element 78, a memory element 80, and a processing element 82. The communication element 78 may generally allow communication with systems or devices external to the telematics device 76. The communication element 78 may include signal or data transmitting and receiving circuits, such as antennas, amplifiers, filters, mixers, oscillators, digital signal processors (DSPs), and the like. The communication element 78 may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication element 78 may be in communication with the processing element 82 and the memory element 80.

The memory element 80 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 80 may be embedded in, or packaged in the same package as, the processing element 82. The memory element 80 may include, or may constitute, a "computer-readable medium". The memory element 80 may store the instructions, code, code segments, software, firmware, programs, applications, apps, services, daemons, or the like that are executed by the processing element 82.

The processing element 82 may include processors, microprocessors (single-core and multi-core), microcontrollers, DSPs, field-programmable gate arrays (FPGAs), analog and/or digital application-specific integrated circuits (ASICs), or the like, or combinations thereof. The processing element 82 may generally execute, process, or run instructions, code, code segments, software, firmware, programs, applications, apps, processes, services, daemons, or the like. The processing element 82 may also include hardware components such as finite-state machines, sequential and combinational logic, and other electronic circuits that can perform the functions necessary for the operation of the current invention. The processing element 82 may be in communication with the other electronic components through serial or parallel links that include address busses, data busses, control lines, and the like.

The telematics device 76 may be in communication with one or more of the control system 44, the pressure sensor 64, the linear measurement sensor 65, the barrier position sensor 67, the location sensor 69, the data sources/residential memory 68, the user interface 70, the external memory 71, and/or the entry snout position sensor 73 to receive the operational data. The operational data may comprise the optical data, the radar data, and/or the lidar data. The operational data may further comprise speed data representative of a speed of the machine 10, data representative of vibration signatures of the machine capstan and conveyor rollers, force data representative of the push/pull direction of the machine capstan, hydraulic pressure data representative of machine capstan hydraulic pressure, acceleration data representative of acceleration of the conveyor system 40, data representative of attitudes of the machine 10 and/or the conveyor system 40, pressure data representative of tire pressure sensors, engine load data, engine RPM data, engine temperature data, or the like.

The communication element 78 of the telematics device 76 may be configured to transmit at least a portion of the operational data. The communication element 78 may be configured to wirelessly transmit near real-time operational data as it is captured at the machine 10. The communication element 78 may be configured to wirelessly transmit the operational data via a wireless network 84 to a cloud network 86. The wireless network 84 may comprise a cellular network. By storing the operational data on the cloud network, a remote computing device 88 may be used to access, display, and/or analyze the operational data. Further, the communication element 78 may be configured to transmit signals representative of notifications of errors or issues with the machine 10, such as errors detected by the control system 44, the processing element 82 of the telematics device 76, and/or other components of the machine 10.

The telematics device 76 enables cloud computing of operational data. For example, the remote computing device 88 may be operable download historic and/or current operational data and display it for a remote technician to review for diagnostic and/or monitoring purposes. The remote computing device 88 may also be configured to download the operational data for analysis, including detections of trends, predictive maintenance, and/or implementing artificial intelligence algorithms to detect trends and/or problems with the performance of the machine 10. By analyzing the operational data, the remote computing device 88 may be configured to detect performance of the operator of the machine 10, whether operational data exceeds predefined thresholds, predictive maintenance (such as fuel filter replacements, capstan replacements, or conveyor roller replacements), successful deployment of the barrier segments, efficiency of the operator of the machine 10, risk assessments of the operator of the machine 10, effective placement of variable length barriers, percentage of successful deployment of the barriers, or the like.

The memory element 80 may be configured to store at least a portion of the operational data. Further, the memory element 80 may be configured to provide the operational data to, for example, the processing element 82 and/or for transmittal by the communication element 78.

The processing element 82 of the telematics device 76 may be configured to receive the operational data and store the operational data on the memory element 80 and/or transmit the operational data via the communication element 78. The processing element 82 may further be configured to associate the operational data with the position data from the location sensor 69 and store the operational data and the position data together on the memory element 80 and/or transmit them via the communication element 78.

The telematics device 76 may be configured to perform edge computing. For example, the processing element 82 may be configured to detect when the operational data exceeds a predefined threshold. When detected, the processing element 82 may be configured to direct the communication element 78 to transmit a signal representative of a notification that a predefined threshold has been exceeded. The processing element 82 may be configured to sample the operational data and transmit it (via the communication element 78) and/or store it (via the memory element 80) at a predefined sample rate, e.g., at predefined time intervals. The processing element 82 may be configured to direct the communication element 78 to transmit the operational data stored on the memory element 80 at certain times, such as at the end of operation, the end of a day, or the like. The processing element 82 may be configured to increase the sample rate, e.g., shorten the predefined time intervals when the processing element 82 detects operational data that exceeds a predefined threshold. For example, once the processing element 82 detects operational data above a predefined threshold, the processing element 82 may be configured to continuously log and store operational data after the threshold was exceeded. It may also be configured to continuously transmit the operational data after the threshold was exceeded so as to provide a live or near real-time data stream of operational data to the cloud network 86 and/or the remote computing device 88.

The processing element 82 may also be configured to analyze the captured operational data to determine a trend, including utilizing artificial intelligence algorithms to determine such trends. For example, the processing element 82 may be configured to determine predictive maintenance and/or problems with the performance of the machine 10. By analyzing the operational data, the processing element 82 may be configured to detect performance of the operator of the machine 10, whether operational data exceeds predefined thresholds, predictive maintenance (such as fuel filter replacements, capstan replacements, or conveyor roller replacements), successful deployment of the barrier segments, efficiency of the operator of the machine 10, risk assessments of the operator of the machine 10, effective placement of variable length barriers, percentage of successful deployment of the barriers, or the like.

While the telematics device 76 and the control system 44 are schematically depicted as being separate devices, one or more of these components may be integrated without departing from the scope of the present invention. For example, the communication element 78 of the telematics device 76 may be integrated with or the same as the communication element 62 of the control system 44. Further, the processing element 82 of the telematics device 76 may be integrated with or the same as the processing system 66 of the control system 44, and the memory element 80 of the telematics device 76 may be integrated with or the same as the memory elements 68, 71 connected to or part of the control system 44.

Figure 17:
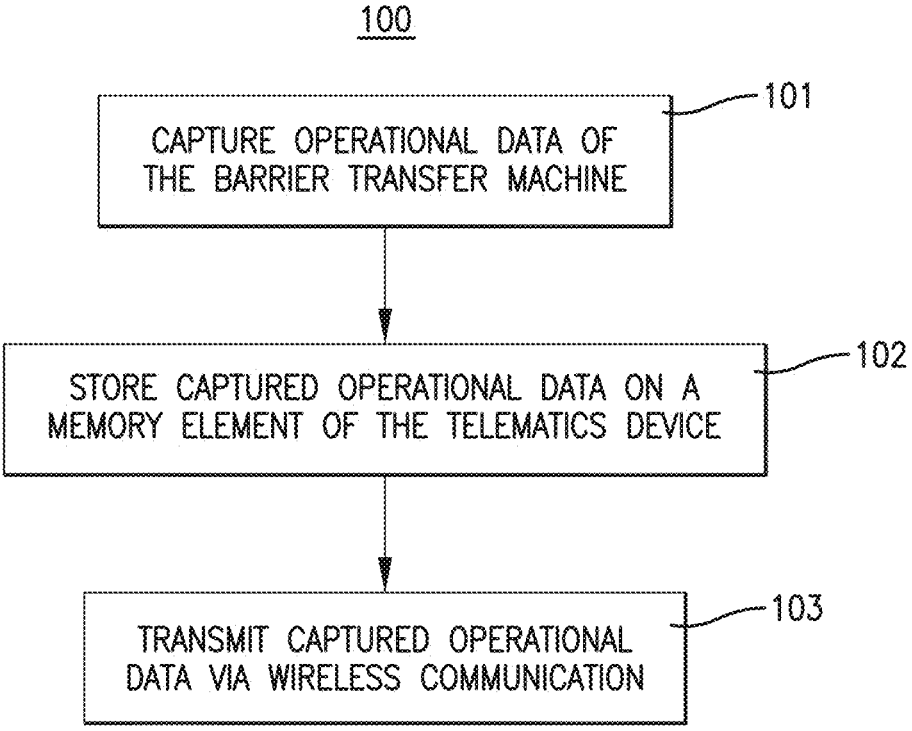
FIG. 17 is a flowchart depicting exemplary steps of a method according to an embodiment of the present invention.

The flow chart of FIG. 17 depicts the steps of an exemplary method 100 of relaying operational data of a barrier transfer machine. In some alternative implementations, the functions noted in the various blocks may occur out of the order depicted in FIG. 17. For example, two blocks shown in succession in FIG. 17 may in fact be executed substantially concurrently, or the blocks may sometimes be executed in the reverse order depending upon the functionality involved. In addition, some steps may be optional.

The method 100 is described below, for case of reference, as being executed by exemplary devices and components introduced with the embodiments illustrated in FIGS. 1-9 and 16. The steps of the method 100 may be performed by the control system 44, the telematics device 76, and/or the remote computing device 88 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 101, operational data of the barrier transfer machine is captured. The operational data may comprise the optical data, the radar data, and/or the lidar data. The operational data may further comprise speed data representative of a speed of the machine, data representative of vibration signatures of the machine capstan and conveyor rollers, force data representative of the push/pull direction of the machine capstan, hydraulic pressure data representative of machine capstan hydraulic pressure, acceleration data representative of acceleration of the conveyor, data representative of attitudes of the machine and/or the conveyor, pressure data representative of tire pressure sensors, engine load data, engine RPM data, engine temperature data, or the like. The operational data may be captured via the plurality of engine sensors, barrier sensors, etc. This step may include directing the operational data to the telematics device via the engine controller. Additionally or alternatively, the telematics device may be connected to the aforementioned sensors. This step may also include capturing position data representative of the geographical position of the machine via the location sensor. This step may further include associating, via the processing element of the telematics device, the position data with the captured operational data, e.g., associating position data representative of the location where the operational data was captured.

This step may include performing edge computing via the processing element of the telematics device. For example, the operational data may be analyzed, via the processing element of the telematics device, to detect when the operational data exceeds a predefined threshold. When detected, this step may include directing, via the processing element of telematics device, the communication element to transmit a signal representative of a notification that a predefined threshold has been detected. Further, the operational data may be sampled and/or received, via the processing element of the telematics device, at a predefined sample rate, e.g., at predefined time intervals. When the predefined threshold is exceeded, the sample rate may be increased, e.g., the predefined time intervals for detecting operational data may be shortened.

The edge computing may further include determining, via the processing element of the telematics device, a trend in the operational data. This step may include utilizing artificial intelligence algorithms to determine such trends. Further, this step may include determining predictive maintenance, problems with the performance of the machine, whether operational data exceeds predefined thresholds, predictive maintenance (such as fuel filter replacements, capstan replacements, or conveyor roller replacements), successful deployment of the barrier segments, effective placement of variable length barriers, percentage of successful deployment of the barriers, or the like. This step may also include examining, via the processing element, performance of the operator of the machine, risk assessments of the operator of the machine, and/or efficiency of the operator of the machine.

Referring to step 102, the operational data is stored on the memory element of the telematics device. The operational data may be stored on the memory element as directed by the configurations of the processing element of the telematics device. This step may include providing the operational data to, for example, the processing element of the telematics device and/or for transmittal by the communication element.

Referring to step 103, the operational data is transmitted via wireless communication. This step may include transmitting the operational data via the communication element of the telematics device. The transmitted operational data may be operational data previously stored on the memory element and/or current or near real-time operational data. The operational data may be transmitted to the cloud network via the wireless network. This step may further include storing the operational data on the cloud network, and accessing, displaying, and/or analyzing the operational data via the remote computing device. Further, this step may include transmitting signals representative of notifications of errors or issues with the machine, such as errors detected by the engine controller, the actuator controller, the processing element of the telematics device, and/or other components of the machine.

This step may include cloud computing and monitoring of operational data. For example, the historic and/or current operational data may be downloaded and displayed via the remote computing device for a remote technician to review for diagnostic and/or monitoring purposes. The operational data may also be downloaded for analysis, via the remote computing device, including detecting trends, determining predictive maintenance, and/or implementing artificial intelligence algorithms to detect trends and/or problems with the performance of the machine. This step may include determining, via the remote computing device, the performance of the operator of the machine, whether operational data exceeds predefined thresholds, predictive maintenance (such as fuel filter replacements, capstan replacements, or conveyor roller replacements), successful deployment of the barrier segments, efficiency of the operator of the machine, risk assessments of the operator of the machine, effective placement of variable length barriers, percentage of successful deployment of the barriers, or the like.

The method 100 may include additional, less, or alternate steps and/or device(s), including those discussed elsewhere herein.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application- specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A telematics device for a barrier transfer machine with machine sensors that capture operational data of the barrier transfer machine associated with a barrier segment, the telematics device comprising:

a processing element configured to receive the captured operational data, the captured operational data comprising a speed of the barrier transfer machine, an acceleration rate of a conveyor system of the barrier transfer machine, and a hydraulic pressure of a capstan cylinder of the barrier transfer machine;

a communication element in communication with the processing element and configured to wirelessly transmit a signal representative of at least a portion of the captured operational data; and a memory element in communication with the processing element and configured to store at least a portion of the captured operational data.

2. The telematics device of claim 1, wherein the communication element is configured to transmit the captured operational data to a cloud network.

3. The telematics device of claim 1, further comprising a location sensor configured to capture position data of the barrier transfer machine.

4. The telematics device of claim 3, wherein the processing element is configured to associate the captured operational data with the position data.

5. The telematics device of claim 1, wherein the processing element is configured to detect when the captured operational data exceeds a predefined threshold.

6. The telematics device of claim 5, wherein the processing element is configured to direct the communication element to transmit the signal and to store the captured operational data on the memory element at predefined time intervals.

7. The telematics device of claim 6, wherein the processing element is configured to shorten the predefined time intervals when the processing element detects captured operational data that exceeds the predefined threshold.

8. The telematics device of claim 5, wherein the communication element is configured to transmit a signal representative of a notification that the captured operational data exceeds the predefined threshold.

9. The telematics device of claim 1, wherein the processing element is configured to analyze the captured operational data to determine a trend.

10. The telematics device of claim 9, wherein the processing element is configured to utilize artificial intelligence algorithms to determine the trend.

11. The telematics device of claim 1, wherein the operational data comprises at least one of image data, radar data, lidar data, speed data, force sensor data, engine load data, engine RPM data, position data of an entry snout, position data of an exit snout, or engine temperature data.

12. A computer-implemented method of relaying operational data of a barrier transfer machine, the computer-implemented method comprising:

capturing, via sensors of the barrier transfer machine, the operational data of the barrier transfer machine comprising a speed of the barrier transfer machine, an acceleration rate of a conveyor system of the barrier transfer machine, and a hydraulic pressure of a capstan cylinder of the barrier transfer machine;

storing, via a processing element of a telematics device in communication with the barrier transfer machine, the captured operational data on a memory element of the telematics device; and transmitting, via a communication element of the telematics device, the captured operational data via wireless communication.

13. The computer-implemented method of claim 12, further comprising storing, via a cloud server processing element, the captured operational data on a cloud database.

14. The computer-implemented method of claim 13, further comprising analyzing, via the cloud server processing element, the captured operational data to detect a trend.

15. The computer-implemented method of claim 12, further comprising analyzing, via the processing element of the telematics device, the captured operational data to detect a trend.

16. A barrier transfer machine for moving along a string of roadway barrier segments, the system comprising:

a chassis;

an engine supported on the chassis and configured to propel the chassis;

an entry snout supported on the chassis and configured to receive the string of roadway barrier segments at a first location, an exit snout supported on the chassis and through which the string of roadway barrier segments exits at a second location, a conveyor system supported on the chassis and configured to serially shift the string of roadway barrier segments from the first location to the secondlocation as the machine moves along the string;

a capstan system comprising two or more wheels mounted alongside the conveyor system and one or more hydraulic cylinders configured to urge the two or more wheels against the string of road barrier segments while the string of road barrier segments is being transported by the conveyor system;

sensors configured to capture operational data comprising a load of the engine, engine RPM, a temperature of the engine, an acceleration rate of the conveyor system of the barrier transfer machine, and one or more pressures of the one or more hydraulic cylinders of the capstan system of the barrier transfer machine;

a processing element in communication with the sensor and configured to receive the captured operational data;

a memory element in communication with the processing element and configured to store at least a portion of the captured operational data; and a communication element in communication with the processing element and configured to wirelessly transmit a signal representative of at least a portion of the captured operational data.

17. The system of claim 16, wherein the processing element is configured to analyze the captured operational data to determine a trend.

18. The system of claim 17, wherein the processing element is configured to utilize artificial intelligence algorithms to determine the trend.

19. The system of claim 16, wherein the processing element is configured to determine the captured operational data exceeds a predefined threshold.

20. The system of claim 17, wherein the communication element is configured to transmit a signal representative of a notification that the captured operational data exceeds the predefined threshold.

\*　\*　\*　\*　\*